Sept. 20, 1971  J. A. BURKE  3,606,073
CAP FOR FLARE FITTING
Filed Dec. 16, 1969
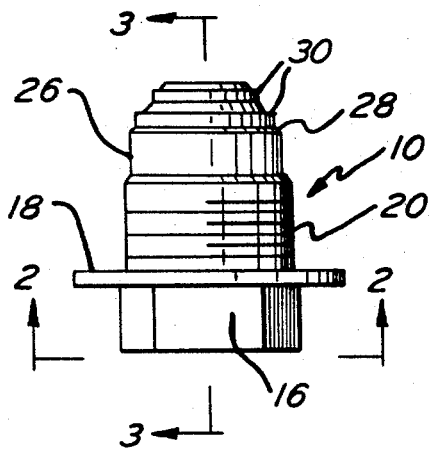
FIG.1
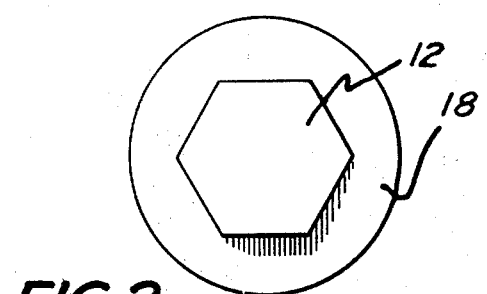
FIG.2
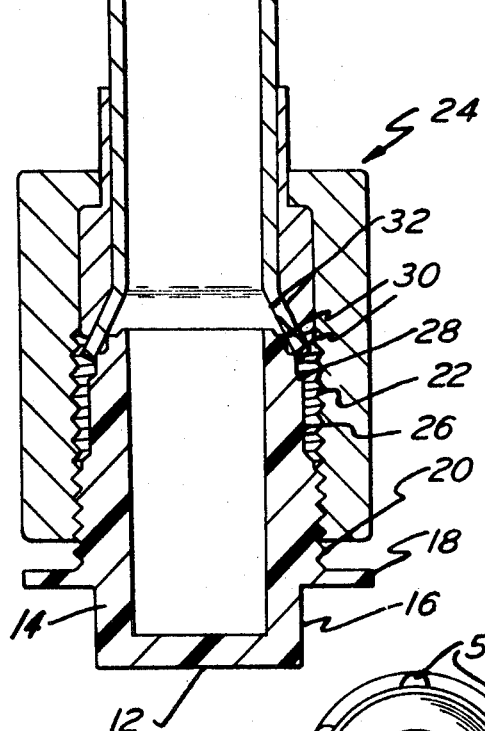
FIG.3
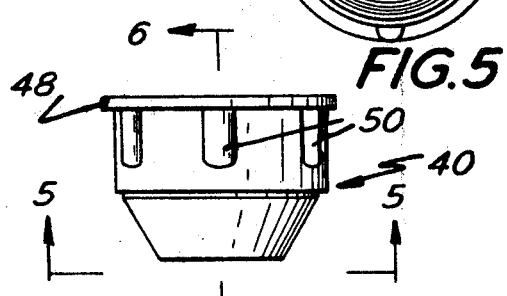
FIG.5
FIG.4
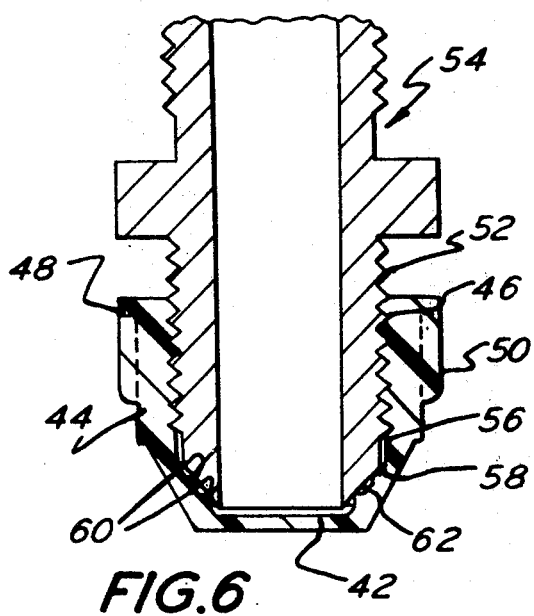
FIG.6
INVENTOR
JOSEPH A. BURKE
BY
ATTORNEY 3,606,073
CAP FOR FLARE FITTING
Joseph Anthony Burke, Elizabeth, N.J., assignor to
Pennwalt Corporation, Philadelphia, Pa.
Filed Dec. 16, 1969, Ser. No. 885,417
Int. Cl. B65d 41/04
U.S. Cl. 220—39                                      3 Claims

ABSTRACT OF THE DISCLOSURE

A plastic cap, for pressure-sealing a tubular threaded flare fitting and protecting its threads, is provided with cooperating threads and a raised thin annular surface on a beveled surface of the cap so that the annular surface engages with a beveled surface of the fitting in sealing relationship.

---

This invention relates generally to a closure or cap, but more particularly to a cap for a threaded flare fitting. It is to be understood that although the invention will generally be used in connection with conventional flare fittings used in industry, it may be used in conjunction with any type of threaded fitting having a flared or beveled portion at the end thereof.

Flare fittings are largely used to establish a fluid-tight connection between associated apparatuses operating, for example, under hydraulic pressure. The flare fittings are often capped after the apparatuses are disconnected. Capping the flare fitting serves two purposes. It not only protects the threads of the fitting, but it also acts to contain fluid within the apparatus, for example during shipment when fluid expansion might occur. Although a great many thread protectors per se have been proposed and used, they are not entirely satisfactory for use on a system subject to change in internal pressure. The reason for this apparently is either that the testing fluid leaks out between the thread protector and the pipe threads, or that any sealing means provided is not effective. Consequently a device was needed which would not only protect the threads of a fitting, but provide adequate assurance against leakage therefrom.

Therefore, one of the principal objects of the present invention is to provide a cap for a threaded flare fitting which not only protects the threads thereof, but seals the end of the fitting against leakage under hydraulic pressure.

Another object is to provide a cap which is resistant to chemical deterioration and is not subject to rot or mildew.

Another object is to provide a cap which can be manufactured at low cost.

Another object is to provide a cap, for both pressure-sealing and thread-protection, that is of relatively simple construction.

Another object is the provision of a cap which can be hand-tightened, but requires mechanical means to untighten due to the high frictional force generated by its unique construction.

Another object is to provide a cap which provides a very effective sealing means by generating a high normal sealing pressure between the sealing surfaces.

Accordingly, the present invention seeks to accomplish such objects by providing a low cost plastic cap having a thin annular sealing surface thereon, at which annular sealing surface a high normal pressure is generated as a result of the holding force produced by the cooperating threads between the cap and the flare fitting.

Further objects and advantages of the invention will be apparent from the detailed description below.

In the drawings:

FIG. 1 is a side view of a male cap embodying the invention in its preferred form;

FIG. 2 is an end view of the same taken along line 2—2 of FIG. 1;

FIG. 3 is a longitudinal sectional view on an enlarged scale of the cap of FIG. 1, taken along line 3—3 thereof, and shown connected to a flare fitting;

FIG. 4 is a side view of a female cap, illustrating a modification of the invention;

FIG. 5 is an end view of the female cap taken along line 5—5 of FIG. 4;

FIG. 6 is a longitudinal sectional view on an enlarged scale of the female cap, taken along line 6—6 of FIG. 4, and shown connected to a fitting.

The qualities of the present invention are enhanced by the characteristics of the material. The cap of the present invention is formed of polyethylene or like resilient and locally distortable plastic substance having similar properties. Such a material is practically inert, and is impervious to most chemical products and the elements. Such a material can be molded at low cost. Due to its frictional nature, the material is well suited to the present invention where it is desired to have a cap which can be hand-tightened, but requires mechanical means to untighten. This will be more fully explained below.

The preferred embodiment of the invention, a male cap, is set forth in FIGS. 1 to 3. The male cap is generally designated by the numeral 10. As shown in FIG. 3 the cap is formed as a hollow body open at one end thereof, and comprising an end wall 12, and a cylindrical side wall 14 projected from the periphery thereof in an axial direction.

Along the cylindrical side wall 14 is a first portion thereof comprising a head 16 adjacent the end wall 12, a radially extending circular flange 18, and threads 20 on the outer surface of the cylindrical side wall 14. Head 16 is of hexagonal cross section which allows for tightening or untightening the cap 10 by hand or by wrench. The threads 20 of the cap 10 mate with the National Fine threads 22 of a flare fitting generally designated by the numeral 24.

Adjacent the first portion of the cap 10, at the end thereof opposite end wall 12, is a second portion thereof extending in an axial direction comprising a section 26 of circular cross section, and having a beveled surface 28 with two raised thin annular surfaces 30 thereon. Annular surfaces 30 abut against a beveled surface 32 of the flare fitting 24 when the cap 10 is operatively connected thereto.

Thus, as can be seen, the male cap 10 of the present invention can be used very effectively in a flare fitting such as indicated at 24 for sealing the fitting and protecting its threads. When connecting the cap 10 to flare fitting 24, the circular section 26, being of lesser diameter than threads 20, and having beveled surface 28 adjacent thereto, serves to guide the cap into the fitting. Once operatively connected to the fitting 24, cooperating threads 20 and 22 provide the holding force necessary to generate a high normal pressure between annular surfaces 30 of the cap 10, and beveled surface 32 of the fitting 24. The thinner the annular surfaces 30 are in a direction away from and normal to beveled surface 28 the less will be the point of contact with the beveled surface 32, and the greater will be the pressure between annular surfaces 30 and the beveled surface 32 for a given amount of holding force applied by tightening the cap 10 onto the fitting 24. Thus, a fluid tight seal is effected by a high normal force distributed over a very small annular area.

As mentioned above, due to the distortionable and frictional nature of the material used for the invention, a high normal pressure generated between the annular surface 30 and the beveled surface 32, produces a high frictional force which prevents the cap 10 from being untightened except with the aid of a wrench or other mechanical device, even though hand-tightened by a person of ordinary strength.

The threads 22 of the fitting 24 are protected due both to the circular flange 18 which extends over the threads, and also to the resilient and flexible nature of the polyethylene or similar plastic used. Circular flange 18 also acts to limit axial movement of the cap 10 in the event the length of fitting 24 is too long for cap 10, and as an abutting means for the fingers or mechanical device used during tightening or untightening of the cap 10.

FIGS. 4, 5, and 6 set forth a modification of the invention in the form of a female cap generally designated by the numeral 40. As shown in FIG. 6 cap 40 is formed as a hollow body open at one end thereof, and comprising an end wall 42 and an annular side wall 44 projected from the periphery thereof.

Along the annular side wall 44 is a first portion thereof which comprises internal threads 46, a radially extending circular flange 48, and gripping means 50. Gripping means 50 comprises a plurality of axially extending raised surfaces which allows for tightening the cap by hand or mechanical means. Threads 46 of cap 40 mate with the National Fine threads 52 of a fitting generally designated by the numeral 54.

Adjacent the first portion of the annular side wall 44 is a second portion thereof which comprises a section 56 of circular cross section and a beveled surface 58 having two raised thin annular surfaces 60 thereon. Annular surfaces 60 abut against a beveled surface 62 of the fitting 54 when cap 40 is operatively connected thereto. As previously explained, the thinner the annular surfaces 60 are in a direction away from and normal to the beveled surface 58, the greater will be the pressure between surfaces 60 and 62 for a given amount of holding force.

Thus, it can be seen that cap 40 functions in like manner to that described above with respect to cap 10. The annular surfaces 60 of cap 40, and beveled surface 62 of the fitting cooperate to effect a seal due to the high normal pressure existing between the surfaces as a result of the holding force produced by cooperating threads 46 and 52 of the cap 40 and fitting 54 respectively.

Circular flange 48 serves as an abutting means for the finger or mechanical device used for tightening or untightening. It also serves to limit axial movement of cap 40 in the event that the fitting is not of sufficient length to allow the beveled surface 62 to properly abut the cap 40 at the annular surfaces 60.

Although specific embodiments of the invention have been described, it is not intended to limit the invention solely thereto, but to include all of the obvious variations and modifications within the spirit and scope of the appended claims.

What is claimed is:

1. A thread-protecting, pressure-sealing cap, adapted for connection to a tubular flare fitting having internal threads thereon, said cap comprising in its unmounted condition, a unitary elongated body being symmetrical about a longitudinal axis, and formed of resilient and locally distortable plastic material, said body including a first portion extending away from one end of said body in the direction of said axis and having external threads thereon, said threads being adapted to cooperate with the internal threads on said flare fitting whereby the threads on said fitting are protected, structure defining gripping means on said first portion for gripping said cap for connection to said flare fitting and a second portion extending away from said first portion in the direction of said axis and terminating with an annular beveled surface adjacent the other end of said body, said beveled surface of said second portion having integrally formed sealing means thereon, said sealing means comprising at least one raised annular surface which continuously decreases in width in a direction away from said beveled surface of said second portion to form a sharp annular sealing edge.

2. A thread-protecting, pressure-sealing cap according to claim 1 in which said unitary body comprises an end wall located at said one end thereof, said end wall being disposed normal to said longitudinal axis, and a longitudinally extending side wall projecting from the periphery of said end wall, said first and said second portions together comprising said side wall.

3. A thread-protecting, pressure-sealing cap according to claim 2, in which a plurality of said raised annular surfaces are disposed on said beveled surface.

References Cited

UNITED STATES PATENTS

| 2,950,033 | 8/1960 | Henchert | 220—39X |
| 3,027,042 | 3/1962 | Graves | 220—39 |
| 2,950,033 | 8/1960 | Henchert | 220—39X |

GEORGE T. HALL, Primary Examiner

U.S. Cl. X.R.

138—96; 215—49